(12) United States Patent
Yang (10) Patent No.: US 6,991,364 B2
(45) Date of Patent: Jan. 31, 2006

(54) SAME-HAND CONTROL OF A MULTI-FUNCTION DEVICE

(75) Inventor: Jong H. Yang, Concord, MA (US)

(73) Assignee: The Timberland Company, Stratham, NH (US)

( * ) Notice: Subject to any disclaimer, the term of this patent is extended or adjusted under 35 U.S.C. 154(b) by 421 days.

(21) Appl. No.: 09/919,668

(22) Filed: Jul. 31, 2001

(65) Prior Publication Data

US 2003/0026170 A1    Feb. 6, 2003

(51) Int. Cl.
A44C 5/00    (2006.01)
A44C 5/04    (2006.01)
G04B 37/00   (2006.01)

(52) U.S. Cl. .............. 368/281; 368/282; 224/164; 224/175

(58) Field of Classification Search ........... 368/276, 368/278, 281–282, 69; 224/172, 175, 217, 224/903, 164
See application file for complete search history.

(56) References Cited

U.S. PATENT DOCUMENTS

| 3,700,385 | A | * | 10/1972 | Sherwood | ............... 52/36.6 |
| 4,396,296 | A | * | 8/1983 | Stodden | ............... 368/101 |
| 4,652,141 | A | * | 3/1987 | Arai | ............... 368/278 |
| 4,681,462 | A | * | 7/1987 | Lloyd | ............... 368/69 |
| 5,088,072 | A | * | 2/1992 | Fitzmorris | ............... 368/69 |
| 5,124,960 | A |   | 6/1992 | Miller et al. | |
| 5,659,611 | A |   | 8/1997 | Saksa | |
| 5,749,841 | A | * | 5/1998 | Moore | ............... 602/21 |
| 5,779,113 | A | * | 7/1998 | Huang | ............... 224/172 |
| 5,801,704 | A |   | 9/1998 | Oohara et al. | |
| 5,871,406 | A |   | 2/1999 | Worrell | |
| 6,144,620 | A | * | 11/2000 | dePoortere | ............... 368/108 |
| 6,392,962 | B1 | * | 5/2002 | Wyatt | ............... 368/107 |

FOREIGN PATENT DOCUMENTS

| DE | 19911404 A1 | 9/2000 |
| GB | 2286035 | 8/1995 |
| WO | WO97/27674 | 7/1997 |
| WO | WO 0119055 A1 | 4/2000 |

\* cited by examiner

*Primary Examiner*—Vit W. Miska
(74) *Attorney, Agent, or Firm*—Lerner, David, Littenberg, Krumholz & Mentlik, LLP (57) ABSTRACT

There is disclosed herein a limb-mounted device that is controlled by one or more inputs disposed within reach of the fingers of a user on the same hand that is associated with the limb. The inputs may be disposed upon a retractable or removable surface so that they have an operative position, in which they are within reach of the fingers, and an inoperative position, in which they are stowed outside reach of the fingers, but in a manner otherwise convenient to the user.

11 Claims, 7 Drawing Sheets

SAME-HAND CONTROL OF A MULTI-FUNCTION DEVICE

BACKGROUND OF THE INVENTION

Wrist watches have been used for decades. The emergence of digital electronics brought with it digital watches. And with improvements in electronics, advanced timekeeping functionality has increasingly appeared in wrist-mounted devices. In addition, functionality beyond timekeeping has become possible in small, wearable devices such as wrist-mounted personal organizers and small radios that may be strapped to an arm while jogging.

These and similar devices, referred to herein as "multi-function devices", typically include one or more user inputs to control operation. The inputs, such as buttons, switches, and dials, may be integrated into a casing for such a device. In a well known example, a digital wristwatch may be switched from a time display to a date display by pushing a button at the perimeter of the watch face. Embedding control inputs within a device makes the device relatively compact. However, this interface can be difficult to operate when a user's other hand is occupied, or when the user is engaged in a physical activity such as jogging or bicycling.

One approach to this problem has been to create athletic apparel that integrates a multi-function device with user inputs that are accessible to the fingers of a user. For example, U.S. Pat. No. 5,749,841 to Moore shows a wrist brace with several buttons disposed over a wearer's palm, and a watch controlled by the buttons that is disposed on the outside of the wrist brace and over the user's wrist. In this configuration, a user may wear a wrist brace and a watch at the same time, and may conveniently operate the watch with the same hand that is protected by the wrist brace. As a significant disadvantage, this watch/wrist brace combination is bulky, and is not well suited to use as a general timekeeping device.

There remains a need for same-hand control of multi-function devices. More particularly, there remains a need for a wrist-mounted, multi-function device that can be controlled by the hand of a user that is associated with the same limb to which the device is secured.

SUMMARY OF THE INVENTION

There is disclosed herein a limb-mounted device that is controlled by one or more inputs disposed within reach of the fingers of a user on the same hand that is associated with the limb. The inputs may be disposed upon a retractable or removable surface so that they have an operative position, in which they are within reach of the fingers, and an inoperative position, in which they are stowed outside reach of the fingers, but in a manner otherwise convenient to the user.

An apparatus as disclosed herein may include a device adapted to be secured to a limb of a user, the device having a plurality of functions; and one or more inputs disposed upon a substrate. The inputs may be connected with the device to control the plurality of functions, the one or more inputs positioned so as to be operable by one or more digits of a hand of the user associated with the limb of the user when the substrate is in a first position, and positioned so as to be inoperable by the digits of the hand of the user associated with the limb of the user when the substrate is in a second position.

The plurality of functions may include at least one of a time display, a date display, a calendar display, a timer display, a timer start, a timer stop, a timer reset, a stop watch display, a stop watch start, a stop watch stop, a stop watch reset, a lap time display, an alarm, a face illumination, or a directional lighting. The device may include at least one of a timekeeping device, a communications device, a wireless communication device, an electronic organizer, an environmental monitor, a multimedia device, a physiological monitor, a remote control, a Global Positioning System ("GPS") device, a digital camera, a digital audio recorder, or a radio. The device may include at least one of a watch, a pager, a personal digital assistant, or an audio player. The one or more inputs may include at least one of a button, a dial, a switch, a slider, a knob, a joystick, a touchpad, or a piezoelectric device. The one or more inputs may include three buttons.

The device may be secured to a wrist of the user with a device strap. The device strap may be a watch band formed from at least one of rubber, plastic, VELCRO, a flex-band, leather, or webbing. The one or more inputs may be disposed on a glove. The one or more inputs may be disposed on a retractable strap having an extended position wherein the one or more inputs are operable by one or more fingers of the user associated with the limb to which the device is secured and a retracted position wherein the one or more inputs are inoperable by the fingers of the user associated with the limb to which the device is secured.

The one or more inputs may be disposed on a ring connected to the device by a retractable cord. The one or more inputs may control a plurality of states of the device, and a plurality of parameters within at least one of the plurality of states. The one or more inputs may receive alphanumeric input from the user. The substrate may include a retractable band having a retracted position in which the inputs are not operable by a hand of the user associated with the limb to which the device is secured. The substrate may include a retractable band having a retracted position in which the retractable band is disposed over a wrist strap that secures the device to a wrist of the user. The substrate may include a band of at least one of rubber, plastic, VELCRO, a flex-band, leather, or webbing. The device may include a watch adapted to at least one of running, hiking, bicycling, sailing, swimming, or scuba diving.

An apparatus as described herein may include a watch. A watch band may be coupled to the watch that secures the watch to a wrist of a user. A retractable band may be coupled to at least one of the watch band and the watch, the retractable band having a first position in which the retractable band covers the watch band and a second position in which the retractable band passes between a thumb and an index finger of a user to support the retractable band in the second position. One or more inputs may be disposed on the retractable band and arranged so that the user may operate the one or more inputs to control operation of the watch when the retractable band is in the second position.

An apparatus as described herein may include a watch. A watch band may be coupled to the watch that secures the watch to a wrist of a user. The apparatus may include a glove having one or more inputs disposed thereupon, the one or more inputs arranged to permit activation of the one or more inputs by one or more digits of a hand of the user associated with the wrist of the user and placed within the glove. The one or more inputs may be coupled through a detachable connector to the watch to control operation of the watch.

An apparatus as described herein may include a watch. A watch band may be coupled to the watch that secures the watch to a wrist of a user. The apparatus may include a ring having one or more inputs disposed thereupon, the ring configured to be removably and replaceably affixed to a digit of the user, the one or more inputs arranged on the ring to permit activation of the one or more inputs by one or more digits of a hand of the user associated with the wrist of the user, the one or more inputs connected to the watch by a cord to control operation of the watch.

In this apparatus, the cord may be a retractable cord that winds onto a spring-loaded coil when the ring is not in use. The apparatus may further include a plurality of rings, each ring having one or more inputs disposed thereupon, each ring configured to be removably and replaceably affixed to a digit of the user, and each ring connected to the watch by a cord.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, such as a watch with a retractable wrist strap including a number of buttons that can be moved between a retracted position and an operative position. However, it will be understood by those of ordinary skill in the art that the methods and systems described herein may be suitably adapted to other devices, such as wrist-mounted pagers or arm-mounted radios, and to other configurations of inputs such as buttons or dials disposed on a glove. Further, a wide variety of inputs may be provided, as discussed further below. All such adaptations and modifications that would be clear to one of ordinary skill in the art are intended to fall within the scope of the invention described herein.

Figure 1:
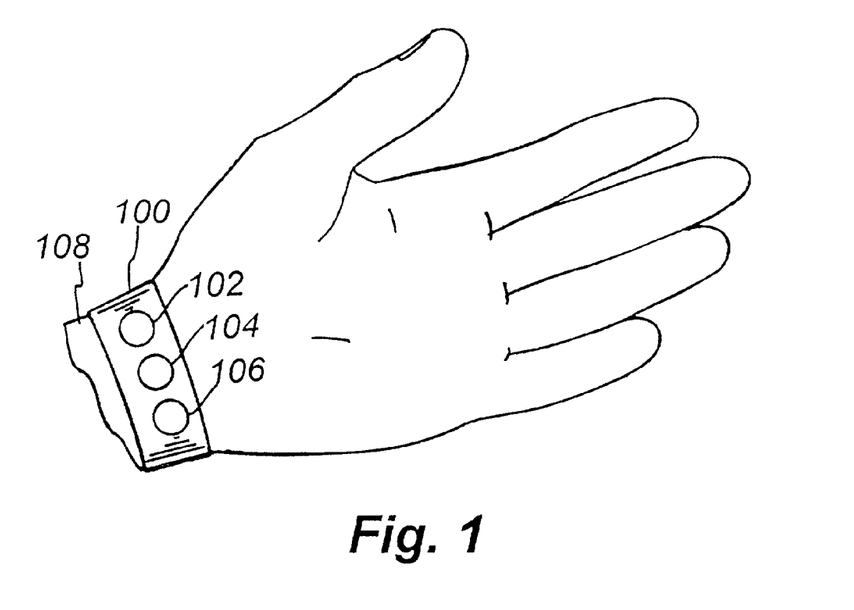
FIG. 1 depicts a three-input strap in a retracted position.

FIG. 1 depicts a three-input strap in a retracted position. A strap 100, which may be an extendable strap, may include a first input 102, a second input 104, and a third input 106. The inputs 102–106 may be, for example, buttons, switches, micro-switches, momentary switches, or other mechanically operated switches or input devices capable of providing control signals to a device in response to mechanical activation. The inputs 102–106 may also include solid state electronic transducers such as capacitive overlay touch pads, resistive overlay touch pads, piezo-electric transducers, and so forth. As depicted in FIG. 1, the strap 100 surrounds a wrist 108 of a user in a retracted position, and may cover a wrist strap (not shown) that secures a device (not shown) to the wrist 108 of the user. In the retracted position, the inputs 102–106 are not generally accessible to the fingers of the user, and may optionally be disabled to prevent activation of the inputs 102–106. The inputs 102–106 may optionally be enabled to permit activation by the other hand of the user.

The device may be any multi-function device that can be usefully secured to a limb. For example, the device may be a timekeeping device such as a watch, a waterproof watch, a stopwatch, or any other horological or chronographic device. The device may be a communications device such as a pager, a beeper, a cellular phone, a digital or analog two-way radio, wireless electronic mail device, or any other wireless communication device. The device may be an electronic organizer such as a personal digital assistant, personal organizer, electronic dictionary, electronic translator, or the like. The device may be an environmental monitor such as a temperature monitor, a wind speed monitor, a pollen count monitor, a carbon dioxide monitor, an altimeter, a barometer, a depth gauge, a humidity monitor, or any other device for measuring an environmental condition. The device may be a multimedia device such as an MP3 player for rendering Motion Picture Experts Group ("MPEG") Audio Layer 3 files, an MPEG player, a cassette player, or any other device for rendering electronic media in audio or video form. The device may be a physiological monitor such as a heart rate monitor, a blood pressure monitor, or any other device for monitoring a physiological condition. The device may be a remote control for providing infrared, radio frequency, or other wireless control signals to a remote device such as a stereo, compact disc player or other audio/visual component, television, television set-top box, camera, garage door opener, keyless entry system, keyless ignition system, and so forth. The device may also be a Global Positioning System ("GPS") device, a digital camera, a digital audio recorder, a radio, or any other device. Further, the device may include any combination of the above functions and devices as may suitably be provided in a wrist-mounted or limb-mounted device.

Where the device is a timekeeping device such as a digital watch, the device may be further adapted to one or more sports activities or timekeeping functions. For example, if the watch is adapted to sailboat racing, the watch may be water resistant, and may include builtin timers for five minute, ten minute, and fifteen minute countdowns typically used to start sailing races. If the watch is adapted to scuba diving, the watch may be waterproof to some predetermined depth, such as one hundred meters, and may include a depth gauge and dive time combination in order to detect and track any required decompression. If the watch is adapted to running, the watch may include lap timers in any suitable combination for tracking one or more runners' performance. Similarly, a swimming watch may be waterproof and include one or more lap timers. A watch for hiking may include an altimeter. A watch for bicycling may have inputs disposed in areas to avoid activation when a bicyclist leans on a bicycle's handlebars, such as one the backs of a wearer's fingers, where they may be activated by the wearer's thumb. The watch may be further adapted to use while bicycling, such as by having a watch face oriented for visibility by a bicyclist while riding. A watch for rock climbing, as another example, may have an input built into a glove and disposed on the back of the thumb, where it may be activated by pressing against a firm surface, but would not be activated by pressure inside the hand (e.g., in the palm) that might be experienced while gripping surfaces. The input may also require significant pressure, such that incidental or brief contact would not activate the input. These or any other functions and features may be combined to adapt such a watch as described herein to other sporting activities. It will be appreciated that the above are provided as examples, and should not be interpreted in a limiting sense.

Figure 2:
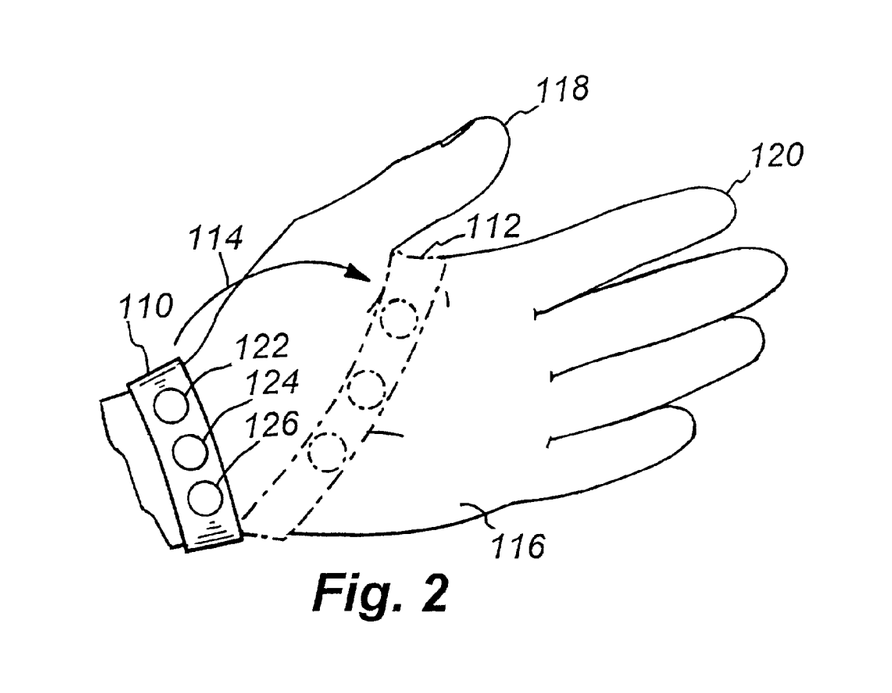
FIG. 2 depicts a three-input strap moving to an operative position.

FIG. 2 depicts a three-input strap moving to an operative position. The strap 110, which may be the strap 100 of FIG. 1, may be moved from the retracted position of FIG. 1 to an extended position 112, as indicated generally by an arrow 114. In the extended position 112, the strap 110 passes across a palm 116 of the user and between a thumb 118 and an index finger 120 of the user. In the extended position 112, or operative position, one or more inputs 122–126 may be activated by the user. The one or more inputs 122–126 may be, for example, the one or more inputs 102–106 of FIG. 1. As used herein, the term 'operative position' refers to any position in which the one or more inputs 122–126 are accessible to fingers of the same hand. At the same time, the term 'extended position' refers generally to a position into which the inputs 122–126 may be moved from an inoperative or retracted position while still connected to the device. Thus, in certain embodiments, such as the removable glove described below, the inputs 122–126 may have an operative position that is not an extended position.

As will be appreciated from FIG. 2, the extended position 112 of the strap 110 will typically span a greater length than the retracted position of the strap 110. This change in length may be realized in a number of ways. For example, the strap 110 may be formed of a flexible material, such as a soft rubber, nylon webbing, or a metal flex-band that includes a number of spring-hinged links that urge the strap 110 towards its retracted position. In other embodiments, the strap 110 may be a non-flexible strap that may be cinched in an extended or retracted position using a watch strap clasp, or that may be secured in various positions using, for example, VELCRO, buttons, hasps, three-bar adjustment slide, sliding bar adjuster, adjuster buckle, ladder lock buckle, side-release snap buckle, cam buckle, or any other mechanism for securing a strap in a range of positions, or at least two different positions. In other embodiments, the strap 110 may be fashioned of a suitably thin material to retract into a spring-loaded roller, so that the strap 110 retracts partially into the roller and, in its retracted position, is disposed about the wrist of the user. More generally, any technique for adjusting the length of a strap between a retracted position and an extended position may be used with the systems described herein, provided they may be extended and retracted while maintaining (or establishing) electrical connections between the device and the one or more inputs 122–126 when the inputs are in the extended or operative position.

Where the electrical connection cannot be physically maintained, or otherwise proves inconvenient, other techniques may be used to maintain a connection between the inputs 122–126 and the device. For example, an independent power supply may be provided with the inputs 122–126, along with circuitry for maintaining a short-range wireless communications link between the inputs 122–126 and the device.

Figure 3:
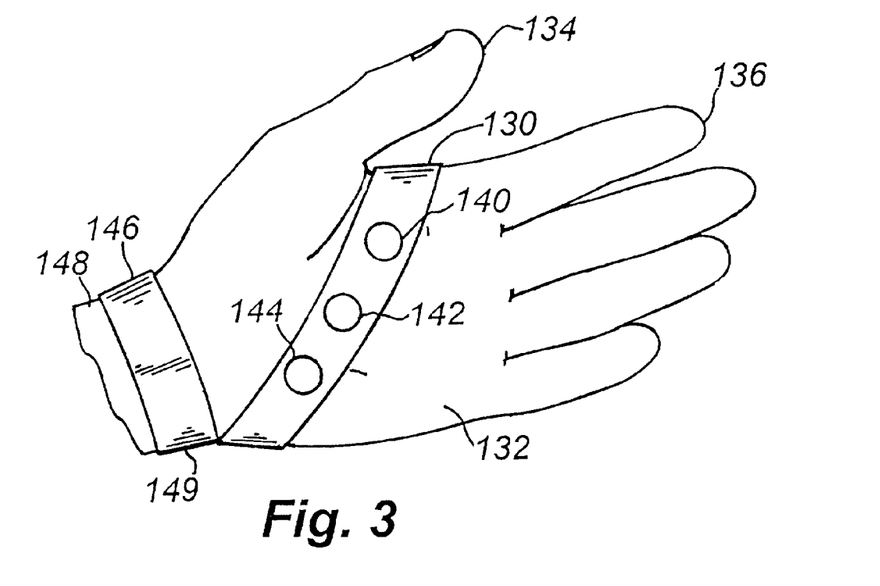
FIG. 3 depicts a three-input strap in an operative position.

FIG. 3 depicts a three-input strap in an operative position. The strap 130 is disposed over a palm 132 of a user and passes between a thumb 134 and an index finger 136 of the user, so that the strap 130 is supported in the operative position and the inputs 140–144 are disposed in an operative position where the inputs 140–144 are accessible to the fingers of the user. A device strap 146, such as a wrist watch strap, remains wrapped about a wrist 148 of a user in order to secure a device (not shown) to the wrist 148 of the user. The device strap 146 may be any suitable material for supporting the device, including conventional wrist watch strap materials such as leather, metal, metal flex-bands, nylon webbing, nylon with VELCRO, rubber, plastic, and so forth. Although not depicted in FIG. 3, the device strap 146 may include any suitable mechanism for securing the device strap 146 about the wrist, including those described above with reference to FIG. 2, and any other mechanism used for wrist watch straps. Where the device strap 146 is flexible, a securing mechanism may be omitted, and the device strap 146 may be extended to pass over the hand of the user in order to remove or replace the device.

Although not visible in FIG. 3, the strap 130 may pass over a back of the hand of the user along a similar path as the visible portion that passes over the palm 132, returning to the device strap 146 at a bottom portion 149. The strap 130 may instead pass over the back of the hand nearer the top, and may, for example, attach to the device or the device strap 146 at any suitable location.

Figure 4:
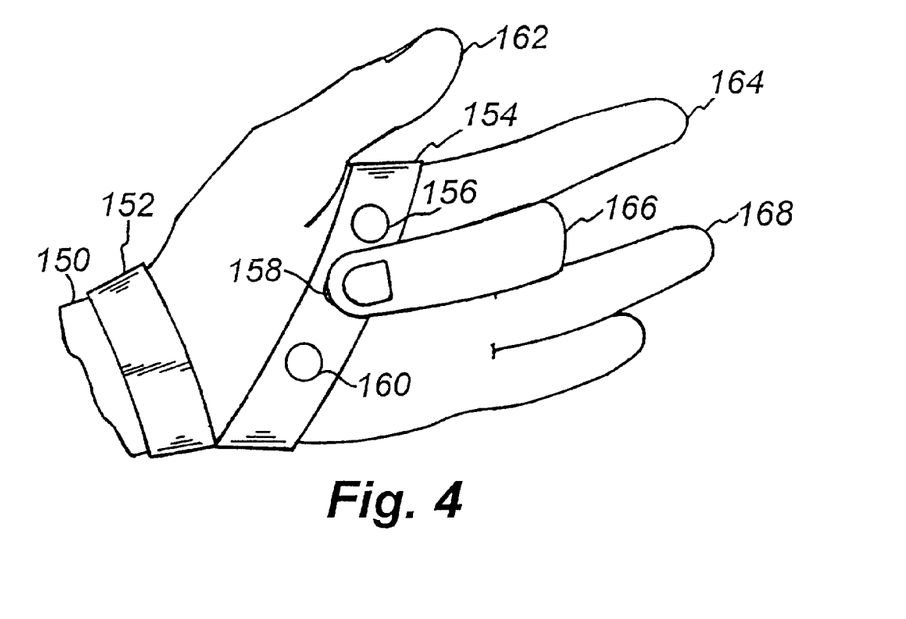
FIG. 4 depicts activation of an input of a three-input strap.

FIG. 4 depicts activation of an input of a three-input strap. As generally described above, a device (not shown) is secured to a wrist 150 of a user by a device strap 152, and a strap 154 that includes one or more inputs 156–160 is disposed in an operative position between a thumb 162 and an index finger 164 of the user. As shown, a middle finger 166 of the user may be curled to activate one of the inputs 158, thus generating a control signal to the device. It will be appreciate that one of the inputs 156–160 may similarly be activated by the index finger 164, a ring finger 168, or some other digit of the user according to the user's mobility, comfort, or convenience.

Figure 5:
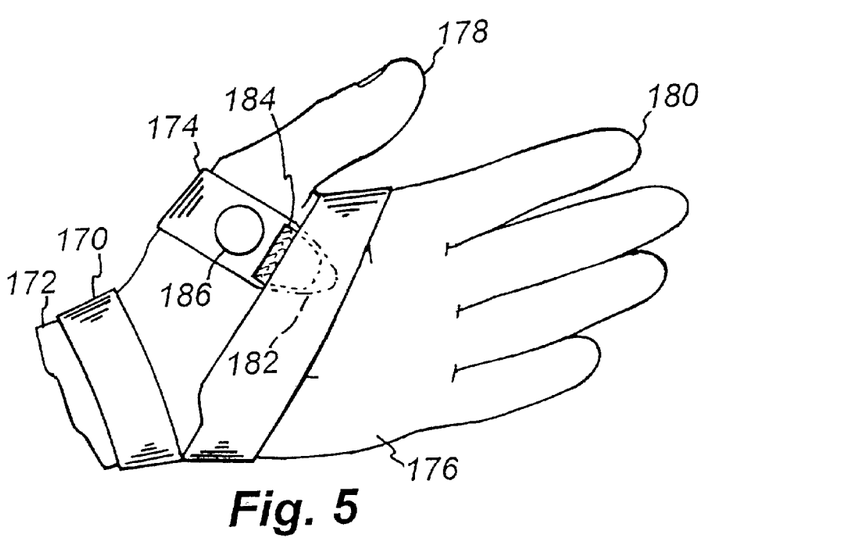
FIG. 5 depicts an embodiment of a same-hand input in an operative position.

FIG. 5 depicts a n embodiment of a same-hand input in an operative position. As generally described above, a device strap 170 secure s a device (not shown) to a wrist 172 of a user. A multi-position strap 174, in an extended position, passes over a palm 176 of the user and between a thumb 178 and an index finger 180 of the user. Rather than returning to the device strap 170 or the device, the multi-position strap 174 may pass around the thumb 178 and be secured at an end 182 by a fastener 184, such as VELCRO, a snap, a snap buckle, a side-release snap buckle, or any other suitable mechanism. An input 186 may be disposed on the multi-position strap 174 so as to be accessible by a finger of the user when in this extended position. The multi-position strap 174 may also include a length adjustment mechanism that adapts a length of the multi-position strap 174 to a particular user.

In order to retract the multi-position strap 174, the fastener 184 may be released, and the multi-position strap 174 may be rolled, or may be wrapped around the wrist 172 and secured to itself (the multi-position strap 174) or the device strap 170. In this retracted position, the multi-position strap 174 may be disposed over the device strap 170 so as to provide the appearance of a single wrist band, or the multi-position strap 174 may be disposed alongside the wrist band.

Figure 6:
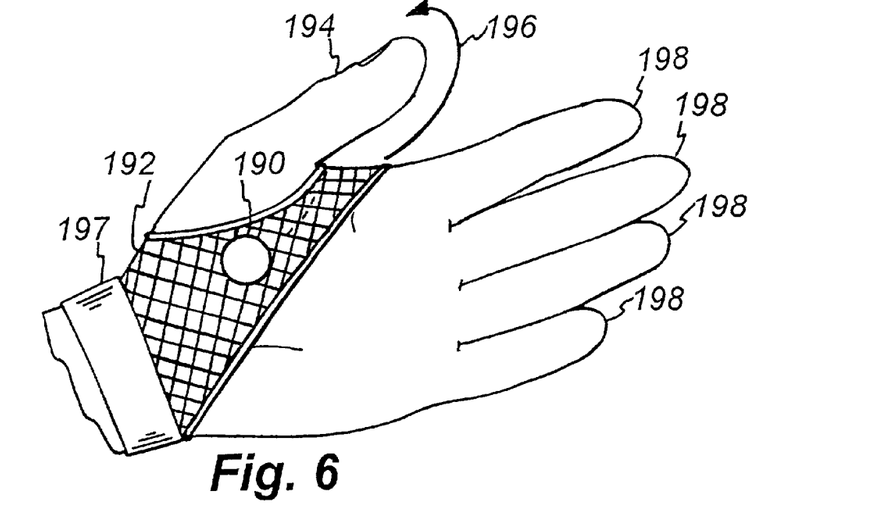
FIG. 6 depicts an embodiment of a same-hand input in an operative position.

FIG. 6 depicts an embodiment of a same-hand input in an operative position. In this embodiment, an input 190 is disposed on a substrate 192, which may be a mesh, a flexible webbing, or other pliable material. The substrate 192 may be stretched over a thumb 194 of a user, as indicated generally by an arrow 196, into a retracted position, in which the substrate 192 may be rolled alongside a device strap 197 and fastened with a snap, VELCRO, or some other fastening mechanism. Optionally, the substrate 192 may be removably fastened to itself or the device strap 197 on a back of the hand (not shown) using, for example, a VELCRO fastener. The input 190 may disposed anywhere on the substrate 192 such that, when the substrate 192 is in an operative or extended position, the input 190 is conveniently accessible to one or more fingers 198 of the hand.

Figure 7:
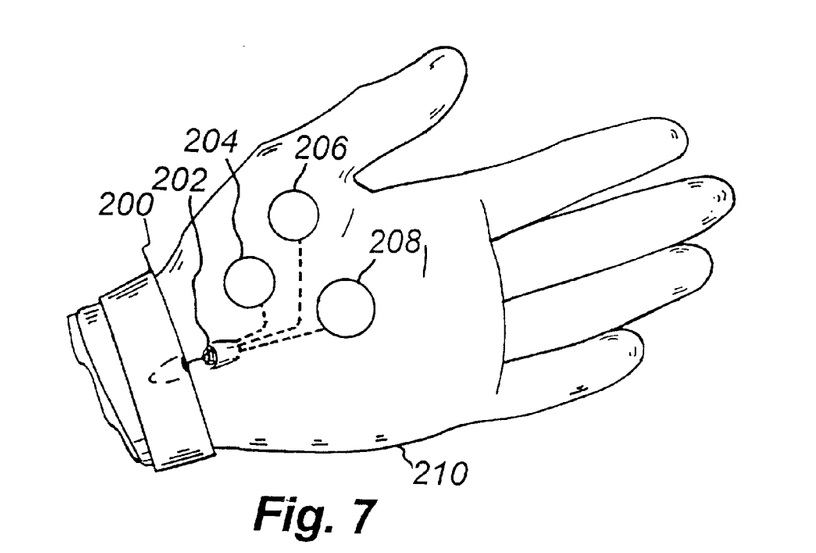
FIG. 7 depicts a three-input glove-based embodiment of a same-hand input.

FIG. 7 depicts a three-input glove-based embodiment of a same-hand input. The glove-based embodiment may include a device strap 200, a connector 202, and one or more inputs 204–208 disposed on a glove 210. The glove 210 may be formed of any suitable material, including leather, nylon, GORETEX, POLAR FLEECE, suede, and so forth. The glove 210 may be water resistant, padded, reinforced, and/or thermally insulated according to its intended use, which may be, for example, running, skiing, hiking, bicycling, scuba diving, or thermal insulation. The device strap 200 may be secured about the glove 210 at the wrist, as depicted, or the glove 210 may be fashioned to pass over the device strap 200, or not to reach the device strap 200. The connector 202 may be removably and replaceably coupled to an adapter within the glove 210 in order to establish an electrical connection with the inputs 204–208. The inputs 204–208 may be disposed in any manner so as to be accessible to fingers of a hand within the glove. As may be observed from FIG. 7, one of the inputs 208 may be conspicuously larger than the others 204–206, so that a user may identify and more easily activate the one of the inputs 208.

Figure 8:
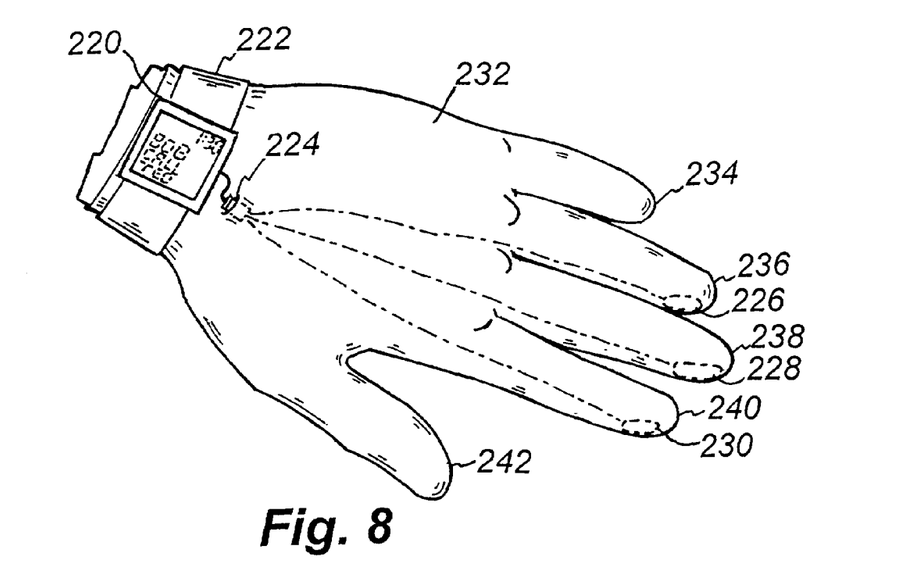
FIG. 8 depicts a three-input glove-based embodiment of a same-hand input.

FIG. 8 depicts a three-input glove-based embodiment of a same-hand input. The glove-based embodiment may include a device 220, a device strap 222, a connector 224, a number of inputs 226–230, and a glove 232 having a number of fingers 234–242. The glove 232 may be, for example, any of the gloves discussed above in reference to FIG. 7. The connector 224 may be removably and replaceably coupled to an adapter within the glove 232 in order to establish an electrical connection with the inputs 226–230. The inputs 226–230 may be disposed on the fingertips of, for example, a ring finger 236, a middle finger 238, and an index finger 240. Each inputs 226–230 may include a micro-switch or other transducer responsive to pressure as might be applied by for example, a thumb 242, or by pressing the input 226–230 against a palm of the glove 232, or be pressing the input 226–230 against a surface.

While depicted as being disposed on a palm side of the fingers 236–240, it will be appreciated that the inputs 226–230 may be disposed on the back hand or outside of the fingers 236–240, such that the inputs 226–230 are activated by applying pressure to the back of the fingers 236–240. This arrangement may be particularly well suited to use with bicycling gloves, where the palm and interior of the hands are typically in contact with bicycle handlebars. In another arrangement, the inputs 226–230 may be mechanically activated by curling the fingers 236–240, such as by tensionable wires passing along the back of the fingers 236–240.

The device 220 and the device strap 222, may generally be any device and strap described above. Several exemplary functions that may be associated with the device 220 are now discussed in further detail. The device 220 may be a digital watch. One of the inputs 226 may be activated to rotate a display of the watch through, in no particular order, a time display, a date display, a calendar display, a timer display, a timer set display, a stop watch display, and an alarm set display. In, for example, the timer display, a second one of the inputs 228 may be activated to rotate through functions of the timer display, such as timer start, timer stop, and timer reset. In the timer set display, a countdown value for the timer may be set. In the stop watch display, the second one of the inputs 228 may be used to start the stop watch, stop the stop watch, and reset the stop watch. In this mode, a third one of the inputs 230 may be used to store a lap time (while the stop watch is running) or switch between a stop time and a lap time (while the stop watch is stopped). The third one of the inputs 230 may also be used to illuminate a face of the digital watch, or a fourth input (not shown) may be provided for illumination functions.

In one embodiment, a light source may be embedded in the device 220 for general illumination rather than illumination of the face of the device 220. For example, a flashlight bulb or other light source may be powered by a power source in the device 220 and may be directed in any suitable direction from the casing or housing for the device 220. The light source may be activated by one of the inputs 226–230. Deactivation of the light source may be manual, e.g., through activation of one of the inputs 226–230, or may occur automatically after a passage of some predetermined amount of time, such as five seconds, ten seconds, or twenty seconds. The intensity of the light source may be adjusted by a thumbwheel.

The device 220 may be a GPS device. A first one of the inputs 226 may permit selection of a waypoint stored in the device. A second one of the inputs 228 may permit switching between views, such as latitude/longitude, direction and distance to a waypoint, ground speed and direction, and so forth. A third one of the inputs 230 may provide illumination of a display associated with the GPS device.

The device 220 may be a media player, such as an MP3 player. In this embodiment, a first one of the inputs 226 may permit selection of tracks of stored music. A second one of the inputs 228 may permit stopping and starting of a selected track. A third one of the inputs 230 may return to the beginning of a selected track. Other inputs may be provided, such as a dial or slider for selecting a volume of a headphone output of the media player.

The device 220 may be an electronic organizer. In this embodiment, a first one of the inputs 226 may select different functions, such as search, edit, store, and so forth. A second one of the inputs 228 may provide for alphanumeric input. Inputs may be coded using, for example, Morse code or some other technique for converting essentially binary (e.g., on/off) inputs into alphanumeric characters. A third input 230 may provide for illumination of a display of the device 220. Additional inputs may be useful for an electronic organizer, such as a keypad, a numeric keypad, a touchpad, and a thumbwheel, each of which may be integrated into the glove 232 as appropriate and useful to control operation of the device 220.

More generally, the inputs 226–230 may be used to control a selection from a plurality of operating states of the device 220, and to control one or more parameters within one or more of the plurality of operating states of the device 220. It will be appreciated that the above devices and functions are provided only as examples, and should not be interpreted in any way to limit the scope of the invention described herein.

Figure 9:
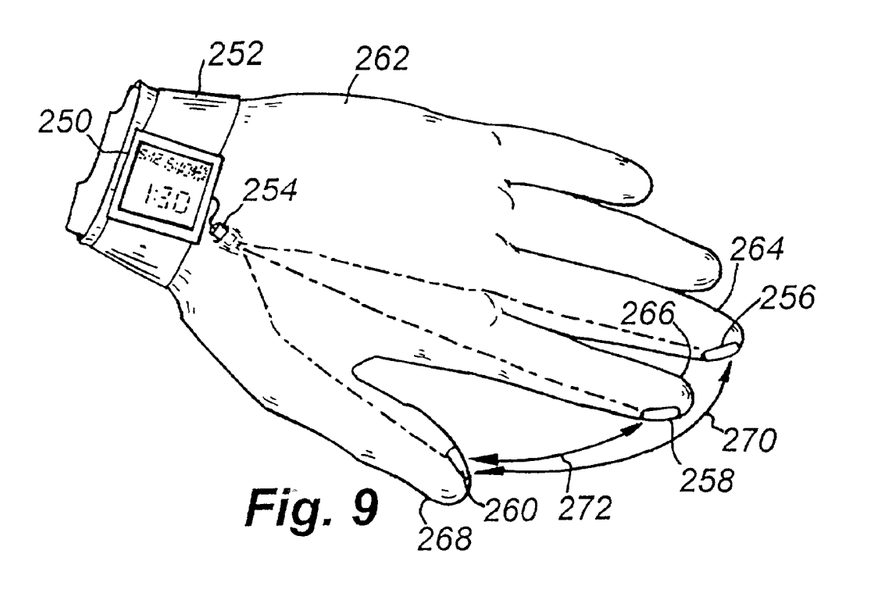
FIG. 9 depicts a two-input glove-based embodiment of a same-hand input.

FIG. 9 depicts a two-input glove-based embodiment of a same-hand input. The glove-based embodiment may include a device 250, a device strap 252, a connector 254, a number of inputs 256–260, and a glove 262 having at least a middle finger 264, an index finger 266, and a thumb 268. The glove 262 may be fashioned as, for example, any of the gloves discussed above in reference to FIG. 7. The connector 254 may be removably and replaceably coupled to an adapter within the glove 262 in order to establish an electrical connection with the inputs 256–260. The device 250 and the device strap 252 may generally be any device and strap described above. In the embodiment of FIG. 9, the inputs 256–260 may include a plurality of electrical contacts fashioned of any suitable metallic or otherwise conducting material. Thus, when the input 256 of the middle finger 264 is contacted to the input 260 of the thumb 268 as indicated by a first arrow 270, a first circuit may be completed to provide a first control signal to the device 250. Similarly, when the input 258 of the index finger 266 is contacted to the input 260 of the thumb 268, as indicated by a second arrow 272, a second circuit may be completed to provide a second control signal to the device 250.

Figure 10:
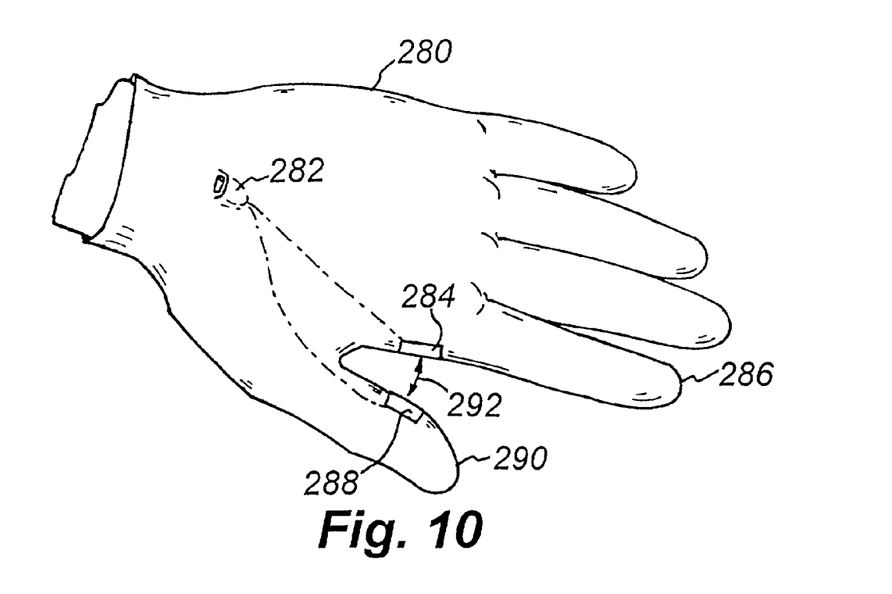
FIG. 10 depicts a one-input glove-based embodiment of a same-hand input.

FIG. 10 depicts a one-input glove-based embodiment of a same-hand input. This embodiment of a glove 280 may include an adapter 282 to receive a connection from a device, a first input 284 disposed on an index finger 286, and a second input 288 disposed on a thumb 290. The first input 284 and the second input 288 may comprise a pair of electrical contacts activated by touching the inputs 284, 288 together as indicated by an arrow 292. In this arrangement, a control signal may be generated by simply touching the index finger 286 and the thumb 288 together. In another embodiment, a single transducer input may be disposed upon either the index finger 286 or the thumb 290, as shown in FIG. 10, and including a switch that is activated when the thumb 290 and the index finger 286 are squeezed together.

Figure 11:
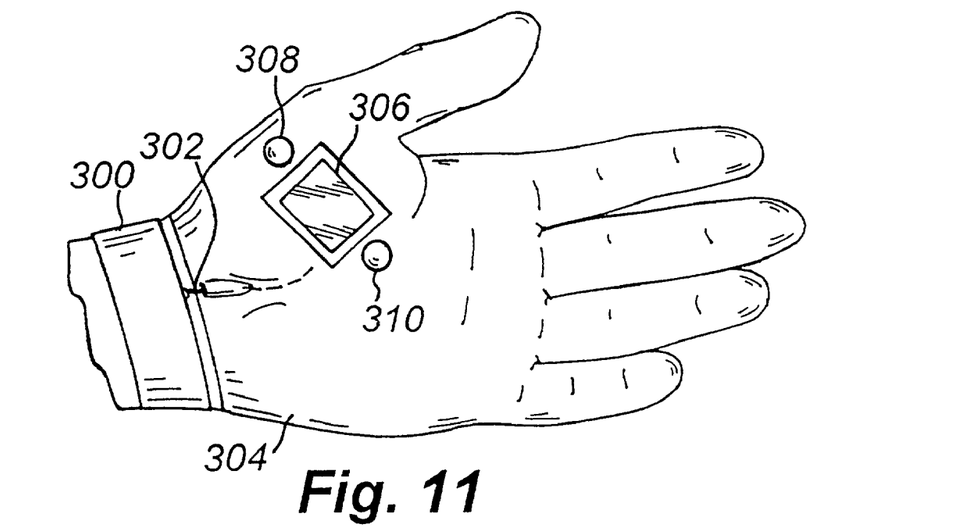
FIG. 11 depicts a touch pad glove-based embodiment of a same-hand input.

FIG. 11 depicts a touch pad glove-based embodiment of a same-hand input. This embodiment may include a device (not shown), a device strap 300, a connector 302, and a glove 304 that includes a touch pad 306 and one or more buttons 308–310. The glove 304 may be fashioned as, for example, any of the gloves discussed above in reference to FIG. 7. The connector 302 may be removably and replaceably coupled to an adapter within the glove 304 in order to establish an electrical connection with the inputs 306–310. The device and the device strap 300 may generally be any device and strap described above. The touchpad 306 may be used to provide alphanumeric or graphical input to the device using symbols such as that provide for a Palm Pilot or other electronic tablets. The glove 304 may include open finger tips if finger contact is required by the touchpad, or is desired to improve resolution of input thereon.

While the buttons and touchpad shown in FIG. 11 are two possible types of input that may be used with the systems described herein, it will be appreciated that other input types are possible. For example, inputs may include a slider, dial, knob, button, switch, joystick, mini-joystick, or any other input transducer that may be adapted to receive manual input when disposed upon one of the substrates described herein.

Figure 12:
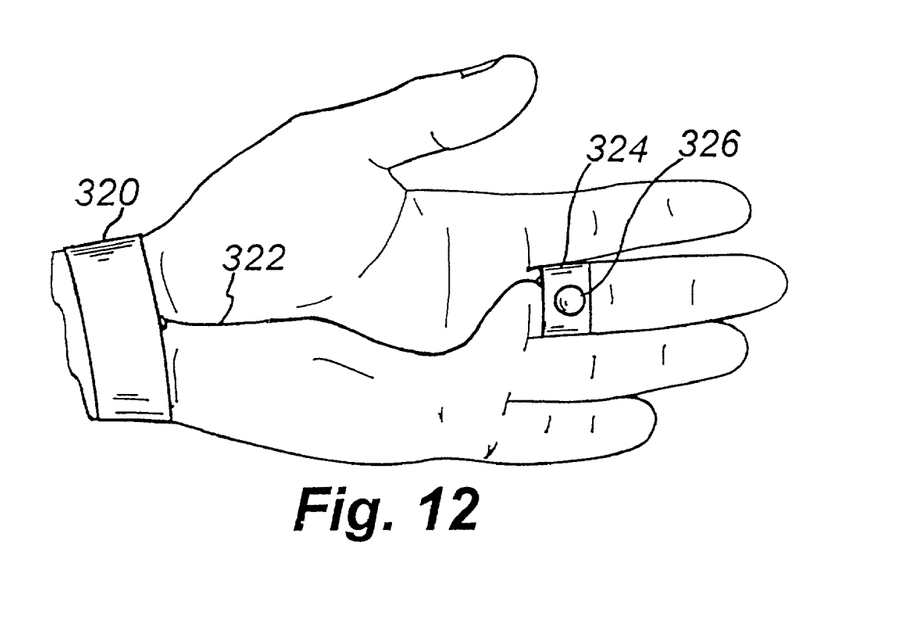
FIG. 12 depicts a one-input ring-based embodiment of a same-hand input.

FIG. 12 depicts a one-input ring-based embodiment of a same-hand input. This embodiment may include a device strap 320, a cord 322, a ring 324, and an input 326. The input 326 may be activated by a finger of a hand of a user, and may in response, generate a control signal through the cord 322 to a device. The device strap 320 may secure the device to a wrist of the user.

The input 326 may be disposed on the ring 324, which may be, for example, a webbing of cloth, nylon, rubber, leather, or any other thin, flexible material. The ring 324 may thus be fastened about a finger of the user in an extended position. In a retracted position, the ring 324 may be slid off of the finger, folded, and affixed to the device strap 320 using VELCRO or some other attachment mechanism. The ring 324 may optionally open, as with a snap, VELCRO, or some other detachable and re-attachable mechanism so that it opens into a rectangular strip of material. This strip may be secured to the device strap 320 in a retracted position. The ring 324 may instead be a band of metal or other solid material with the input 326 disposed thereupon. In a retracted position, this band may rest in a snap or other holder on the device strap 320.

The cord 322 may be a retractable cord that winds into a spring-loaded receptacle on (or in) the device strap 320. The cord 322 may instead wrap around the wrist, with the ring 324 attaching in any of the above manners to the device strap 320. The cord may be fashioned of any material provided that it is sufficiently flexible for retraction and storage as described above, and further provided that it can carry a control signal from the input 326 to the device.

Figure 13:
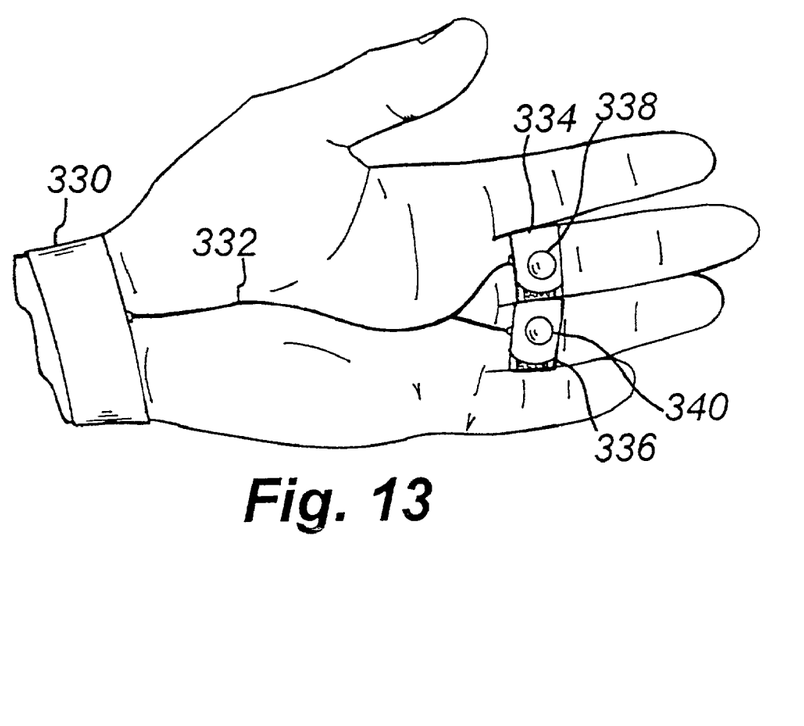
FIG. 13 depicts a two-input ring-based embodiment of a same hand input.

FIG. 13 depicts a two-input ring-based embodiment of a same hand input. This embodiment may include a device strap 330, a cord 332, a number of rings 334–336, each having an input 338–340 disposed thereon. The inputs 338–340 may be activated by a finger of a hand of a user, and may in response, generate a control signal through the cord 332 to a device. The device strap 320 may secure the device to a wrist of the user.

It will be appreciated that the system shown in FIG. 13 may be adapted to a larger number of rings, including two or more rings for each finger if desirable for control of a particular device. It will also be appreciated that the system shown in FIG. 13 may be adapted to devices other than wrist-mounted devices. For example, jogger may secure a cassette player or radio to an arm near or at the biceps. While this may provide a convenient location for connecting headphones to the radio, it may be difficult for the jogger to operate the radio while running even for simple functions such as changing a station or adjusting the volume. Inputs for these functions may be provided on one or more rings, with a cord running to the arm-mounted radio to carry control signals from the joggers fingers to the radio. The cord may retract into the radio on a spring-loaded coil, or may wind around a coil provided externally on a casing for the radio, or may unplug from the radio for remote storage.

Figure 14:
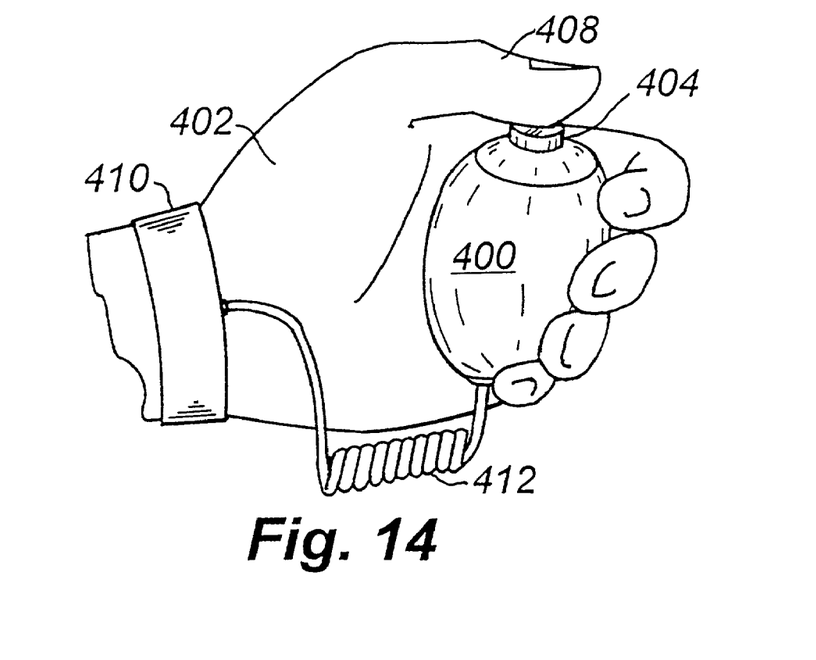
FIG. 14 shows a control pod with user inputs.

FIG. 14 shows a control pod with user inputs. As depicted, a pod 400 may be adapted to be grasped in a hand 402 of a user. The pod may have a number of inputs, such as a button 404, which may be activated by a thumb 408 on the hand 402 of the user. Although not shown, other inputs may be integrated into the pod 400, such as a trigger, slider, or other finger-activated device, or a joystick, thumbwheel, or other input that can be controlled by the thumb 408. The pod 400 may be connected to a wrist strap 410, or directly to a wrist-mounted device (not shown) such as a watch, by a cord 412, which may be a flexible, helical cord or coil, or any of the other retractable and/or detachable cords described above.

While the invention has been disclosed in connection with the preferred embodiments shown and described in detail, it will be understood that the invention is not to be limited to the embodiments disclosed herein, but is to be understood from the following claims, which are to be interpreted as broadly as allowed under the law.

What is claimed is:

1. An apparatus, comprising:
   a device adapted to be secured to a limb of a user with a device strap, the device having a plurality of functions; and one or more inputs disposed upon an input substrate and in communication with the device to control the plurality of device functions, said device strap being separate from said input substrate, the one or more inputs positioned on the input substrate so as to be operable by one or more digits of a hand of the user associated with the limb of the user when the input substrate is in an extended position, and positioned so as to be inoperable by the digits of the hand of the user associated with the limb of the user when the input substrate is in a retracted position;

wherein the input substrate is a retractable band having the retracted position in which the retractable band is disposed over a wrist strap that secures the device to a wrist of the user.

2. The apparatus of claim 1 wherein the device includes at least one of a timekeeping device, a communications device, a wireless communication device, an electronic organizer, an environmental monitor, a multimedia device, a physiological monitor, a remote control, a Global Positioning System ("GPS") device, a digital camera, a digital audio recorder, or a radio.

3. The apparatus of claim 1 wherein the device includes at least one of a watch, a pager, a personal digital assistant, or an audio player.

4. The apparatus of claim 1 wherein the one or more inputs includes three buttons.

5. The apparatus of claim 1 wherein the device is secured to a wrist of the user with the device strap.

6. The apparatus of claim 5 wherein the device strap is a watch band formed from at least one of rubber, plastic, hook and loop fasteners, a flex-band, leather, or webbing.

7. An apparatus comprising:
a watch;
a watch band coupled to the watch that secures the watch to a wrist of a user;
a retractable input band in communication with at least one of the watch band and the watch, said input band being separate from the watch band, the retractable input band having a retracted position in which the retractable band covers the watch band and an extended position in which the retractable band passes between a thumb and an index finger of a user to support the retractable input band in the extended position; and
one or more inputs disposed on the retractable input band and arranged so that the user may operate the one or more inputs to control operation of the watch when the retractable input band is in the extended position.

8. The apparatus of claim 7 wherein the plurality of functions includes at least one of a time display, a date display, a calendar display, a timer display, a timer start, a timer stop, a timer reset, a stop watch display, a stop watch start, a stop watch stop, a stop watch reset, a lap time display, an alarm, a face illumination, or a directional lighting.

9. The apparatus of claim 7 wherein the inputs control a plurality of states of the device, and a plurality of parameters within at least one of the plurality of states.

10. The apparatus of claim 7 wherein the retractable input band comprises at least one of rubber, plastic, hook and loop fasteners, a flex-band, leather, or webbing.

11. The apparatus of claim 7 wherein the watch is adapted to at least one of running, hiking, bicycling, sailing, swimming, or scuba diving.

* * * * *

UNITED STATES PATENT AND TRADEMARK OFFICE
CERTIFICATE OF CORRECTION

PATENT NO.         : 6,991,364 B2
APPLICATION NO. : 09/919668
DATED              : January 31, 2006
INVENTOR(S)        : Jong H. Yang It is certified that error appears in the above-identified patent and that said Letters Patent is hereby corrected as shown below:

Column 6, line 39, please delete "a n" and insert -- an --.

Column 6, line 41, please delete "secure s" and insert -- secures --.

Signed and Sealed this

Tenth Day of July, 2007

JON W. DUDAS
*Director of the United States Patent and Trademark Office*